United States Patent [19]
Kuenzy

[11] 3,878,240
[45] Apr. 15, 1975

[54] PREPARATION OF 2 ALKOXY-5-ALKYLSULPHONYL-BENZOIC ACIDS

[75] Inventor: Fred Kuenzy, Pully, Switzerland

[73] Assignee: Renfag S.A., Cologny-Geneva, Switzerland

[22] Filed: Dec. 18, 1972

[21] Appl. No.: 315,842

[30] Foreign Application Priority Data
July 19, 1972  Switzerland.................. 10803/72

[52] U.S. Cl........ 260/521 S; 260/607 A; 260/609 F
[51] Int. Cl.......................................... C07c 147/06
[58] Field of Search ................................ 260/521 R

[56] References Cited
FOREIGN PATENTS OR APPLICATIONS
1,088,531  10/1967  United Kingdom OTHER PUBLICATIONS
March, "Advanced Organic Chemistry," McGraw Hill Inc., (1968), pages 587, 610, 611, 617.
Boyd et al., J. Chem. Soc., 637, (1928).
Nasipuri et al., J. Ind. Chem. Soc. 40, 327–38, (1963).
Adams et al., J.A.C.S., 81, 4927. (1959).
Madhaulai Shah et al., J. Chem. Soc., 1933, pg. 1375.
Beilstein 6, 352, 6, II, 328–329, 6, II, 333.
Zinke et al., Bericte, 50, 116.
Wessely et al., Monatsh. Chem., 57–78, (1960), C.A., 54, 18409–18412, (1960).

*Primary Examiner*—John F. Terapane
*Attorney, Agent, or Firm*—Robert E. Burns; Emmanuel J. Lobato; Bruce L. Adams

[57] ABSTRACT

A method for preparing a 2-alkoxy-5-alkylsulphonyl-benzoic acid of the general formula

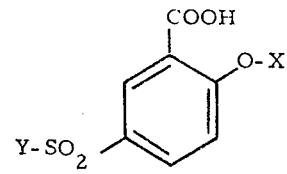

where X and Y are alkyl radicals with from 1 to 4 carbon atoms, consists of alkylating o-cresol with an alkylating agent such as an alkylsulphate, an alkylhalide or an alkylarylsulphate to produce an o-alkoxycresol, bromination of the latter to a 2-alkoxy-5-bromotoluene followed by a reaction with a mercaptide to give a 2-alkoxy-5-alkylthio-toluene, and oxidising the latter with an oxidising agent such as potassium permanganate to a 2-alkoxy-5-alkylsulphonyl-benzoic acid. The final products are useful as intermediates in the pharmaceutical industry.

1 Claim, No Drawings

PREPARATION OF 2 ALKOXY-5-ALKYLSULPHONYL-BENZOIC ACIDS

The invention relates to the preparation of 2-alkoxy-5-alkylsulphonyl-benzoic acids of the general formula

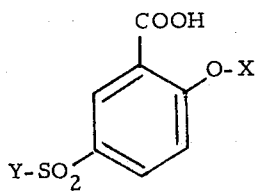

where X and Y are alkyl or alkenyl radicals with from 1 to 4 carbon atoms.

2-alkoxy-5-alkylsulphonyl-benzoic acids are valuable intermediate products for the production of active substances which find application principally in the pharmaceutical industry, especially as therapeutics in the field of gastro-enterology and neurology as well as in other fields of application.

According to the invention, a method for the preparation of these 2-alkoxy-5-alkylsulphonyl-benzoic acids comprises: alkylating o-cresol with an alkylating agent such as an alkylsulphate, an alkylhalide or an alkylarylsulphate to produce an o-alkoxycresol; brominating the o-alkoxycresol to a 2-alkoxy-5-bromotoluene; reacting the 2-alkoxy-5-bromotoluene with a mercaptide to give a 2-alkoxy-5-alkylthio-toluene; and oxidising the 2-alkoxy-5-alkylthio-toluene with an oxidising agent such as potassium permanganate to a 2-alkoxy-5-alkylsulphonyl-benzoic acid.

The 2-alkoxy-5-alkylthio-toluene may firstly be oxidised with a first oxidising agent such as hydrogen peroxide or potassium bichromate to 2-alkoxy-5-alkylsulphonyl-toluene, and the 2-alkoxy-5-alkylsulphonyl-toluene then oxidised with a second oxidising agent such as potassium permanganate to give 2-alkoxy-5-alkylsulphonyl-benzoic acid.

The method according to this invention proceeds according to the following series of reactions:

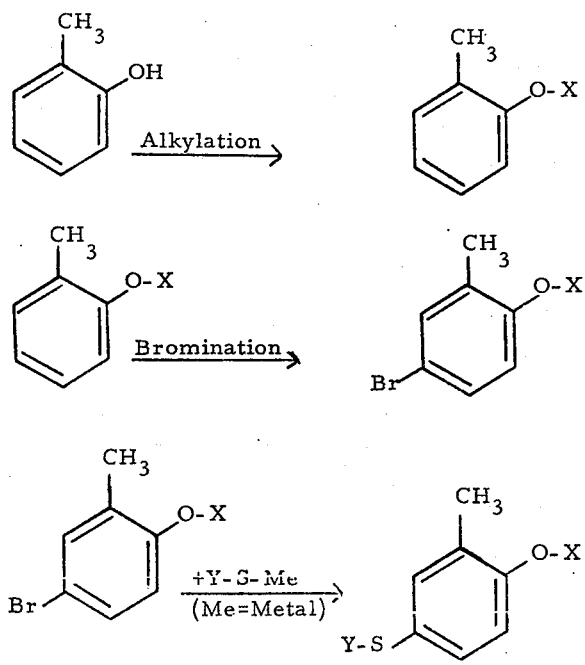

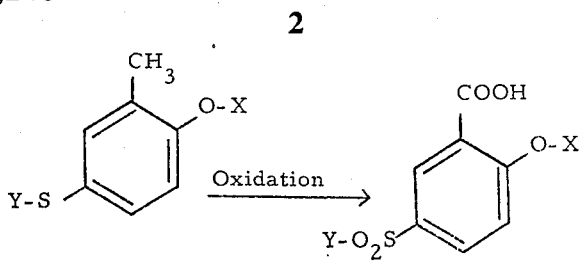

Examples of procedures for the preparation of two benzoic acid derivatives by the method according to the present invention will now be described in detail.

EXAMPLE I

2-Methoxy-5-methylsulphonyl-benzoic acid a. o-Methoxytoluene 324g o-cresol, 300ml water and 300ml caustic soda solution are placed in a 4 litre reaction vessel fitted with cooling means, a thermometer and a dropping funnel. 378g dimethylsulphate are gradually added dropwise to this solution at 30°C and then heated under reflux for 10 minutes. After cooling, a further 150ml caustic soda solution and 189g dimethylsulphate are introduced and heated again under reflux for about 15 minutes. When cool, another 75ml caustic soda solution and 95g dimethylsulphate are added and heated under reflux. After a further cooling, 90ml caustic soda solution are added and heated for 4 hours under reflux.

When cooling is complete, the mixture is diluted with 700ml water and the oil layer is decanted off. The aqueous layer is extracted three times with 300ml methylene chloride.

The separated oil layer and the methylene chloride extracts are dried over sodium sulphate, then filtered off; the solvent is evaporated under vacuum and the resultant oil is distilled.

303g o-methoxytoluene are obtained, with a boiling point of 168°–169°C at 760mm Hg and a yield of 83%.

b. 2-Methoxy-5-bromotoluene 200g 2-methoxytoluene and 200ml acetic acid are placed in a 6 litre reaction vessel fitted with cooling means, a stirrer, a thermometer and a dropping funnel.

To this mixture, a solution of 88ml bromine in 600ml acetic acid is gradually added dropwise keeping the reaction temperature below 25°C, over a period of about 90 minutes.

The mixture is stirred for 3 hours and then poured into a mixture of 4 kg ice and 2 litre water. After standing overnight the precipitate is separated, washed with water and dried in an oven at 50°C.

320g 2-methoxy-5-bromotoluene are obtained with a melting point of 68°C and a yield of 97%.

c. 2-Methoxy-5-methylthio-toluene 40g 2-methoxy-5-bromotoluene, 24g copper methylsulphide, 180ml quinoline and 10ml pyridine are placed in a 500ml reaction flask fitted with a stirrer, cooling means, a thermometer and a nitrogen feed pipe.

The reaction mixture is heated for 16 hours at 200°C under nitrogen, cooled down and poured into 36% hydrochloric acid containing 500g ice.

After extracting three times with 100ml methylene chloride, the organic layer is washed with 20% hydrochloric acid and the solvent is evaporated under vacuum. The oily residue is taken up with ether and filtered. After evaporation of the ether under vacuum the resulting product is distilled.

21g 2-methoxy-5-methylthio-toluene are obtained with a boiling point of 98°–92°C at 1mm Hg and a yield of 63%.

d. 2-Methoxy-5-methylsulphonyl-benzoic acid 50g 2-methoxy-5-methylthio-toluene, 333g potassium permanganate, 40g potassium carbonate and 11.9 litre water are placed in a 20 litre reaction vessel fitted with a stirrer, cooling means, and a thermometer.

The mixture is heated for 10 hours under reflux, cooled and the manganese dioxide produced is separated off. The solution is acidified until colourless and the white precipitate is filtered off. The filtrate is extracted four times with 1 litre methylene chloride.

The organic solution is evaporated to dryness and the residue is added to the previous white precipitate.

29g 2-Methoxy-5-methyl-sulphonyl-benzoic acid are obtained with a melting point of 191°C and a yield of 42%.

EXAMPLE II

2-Methoxy-5-methylsulphonyl-benzoic acid

Stages a to c are the same as for Example I.

d. 2-Methoxy-5-methylsulphonyl-toluene 20g potassium chromate, 4g 2-methoxy-5-methylthio-toluene and 45ml water are placed in a 250ml reaction flask fitted with a stirrer, cooling means, a thermometer and a dropping funnel.

The temperature is raised to 100°C and 60g 95% sulphuric acid are gradually added dropwise. The mixture is stirred for 1 hour at this temperature, cooled and diluted with 50ml water.

The resulting suspension is extracted three times with 100ml chloroform, after which the solvent is evaporated under vacuum and the residue mixed with 10ml water. It is separated, washed with water and dried in an oven at 50°C.

3g 2-methoxy-5-methylsulphonyl-toluene are obtained with a melting point of 64°–65°C and a yield of 63%.

e. 2-Methoxy-5-methylsulphonyl-benzoic acid 1g 2-Methoxy-methylsulphonyl-toluene, 8g potassium permanganate and 200ml water are placed in a 500ml reaction flask fitted with a stirrer, a thermometer and cooling means.

The mixture is heated for 10 hours under reflux, cooled and the precipitate filtered off. The filtrate is acidified until the colour disappears, and this acqueous solution is extracted three times with 50ml chloroform.

The organic solution is evaporated to dryness and the residue taken up in 20ml water and caustic soda. After filtration, the filtrate is acidified and allowed to crystallise. The crystalline product is evacuated off, washed with water and dried in an oven at 50°C.

0.4g 2-methoxy-5-methylsulphonyl-benzoic acid are obtained with a melting point of 190°C and a yield of 34.8%.

EXAMPLE III

2-Methoxy-5-ethylsulphonyl-benzoic acid

Stages a and b are the same as for Example I.

c. 2-Methoxy-5-ethylthio-toluene 20g 2-Methoxy-5-bromotoluene, 40g copper-ethylsulphide, 90ml quinoline and 4ml pyridine are placed in a 250ml reaction flask fitted with a stirrer, cooling means, and a thermometer.

The mixture is heated for 16 hours at 200°C, cooled and poured onto 80ml concentrated hydrochloric acid and ice. This is extracted three times with 50ml methylene chloride, the organic solution washed with 40ml 20% hydrochloric acid, evaporated to dryness and the oily residue taken up with 50ml ether. After filtration the solvent is evaporated under vacuum and the residual product distilled at 9mm Hg.

13g 2-Methoxy-5-ethylthio-toluene are obtained with a boiling point of 128°–131°C at 760mm Hg and a yield of 71.8%.

d. 2-Methoxy-5-ethylsulphonyl-benzoic acid 4.5g 2-methoxy-5-ethylthio-toluene, 34g potassium permanganate and 1 litre water are placed in a 2 litre reaction vessel fitted with a stirrer, cooling means and a thermometer.

The mixture is heated under reflux for 8 hours, cooled, the manganese dioxide produced separated off and the solution acidified until colourless. This is extracted three times with 100ml methylene chloride and the organic layer is evaporated to dryness.

3g 2-Methoxy-5-ethylsulphonyl-benzoic acid are obtained, with a melting point of 126°C and a yield of 49%.

What is claimed is:

1. A method for the preparation of a 2-alkoxy-5-alkylsulphonyl-benzoic acid of the general formula

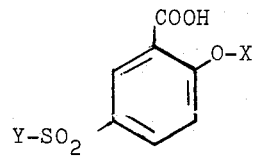

where X and Y are alkyl radicals with from 1 to 4 carbon atoms, comprising: alkylating o-cresol with an alkylating agent selected from the group consisting of alkylsulphates, alkylhalides and alkylarylsulphates to produce an o-alkoxycresol; brominating the o-alkoxycresol to a 2-alkoxy-5-bromotoluene; reacting the 2-alkoxy-5-bromotoluene with a mercaptide to give a 2-alkoxy-5-alkylthio-toluene; and then the 2-alkoxy-5-alkylthio-toluene is oxidised with a first oxidising agent, potassium bichromate, to 2-alkoxy-5-alkylsulphonyl-toluene, and the 2-alkoxy-5-alkylsulphonyl-toluene is then oxidised with a second oxidising agent, potassium permanganate, to 2-alkoxy-5-alkylsulphonyl-benzoic acid.

* * * * *